Sept. 13, 1966  J. G. SPARKES  3,273,028
HERMETICALLY SEALED ELECTROLYTIC CAPACITOR
Filed June 27, 1963  2 Sheets-Sheet 1

INVENTOR.
JULIAN G. SPARKES
BY
ATTORNEY

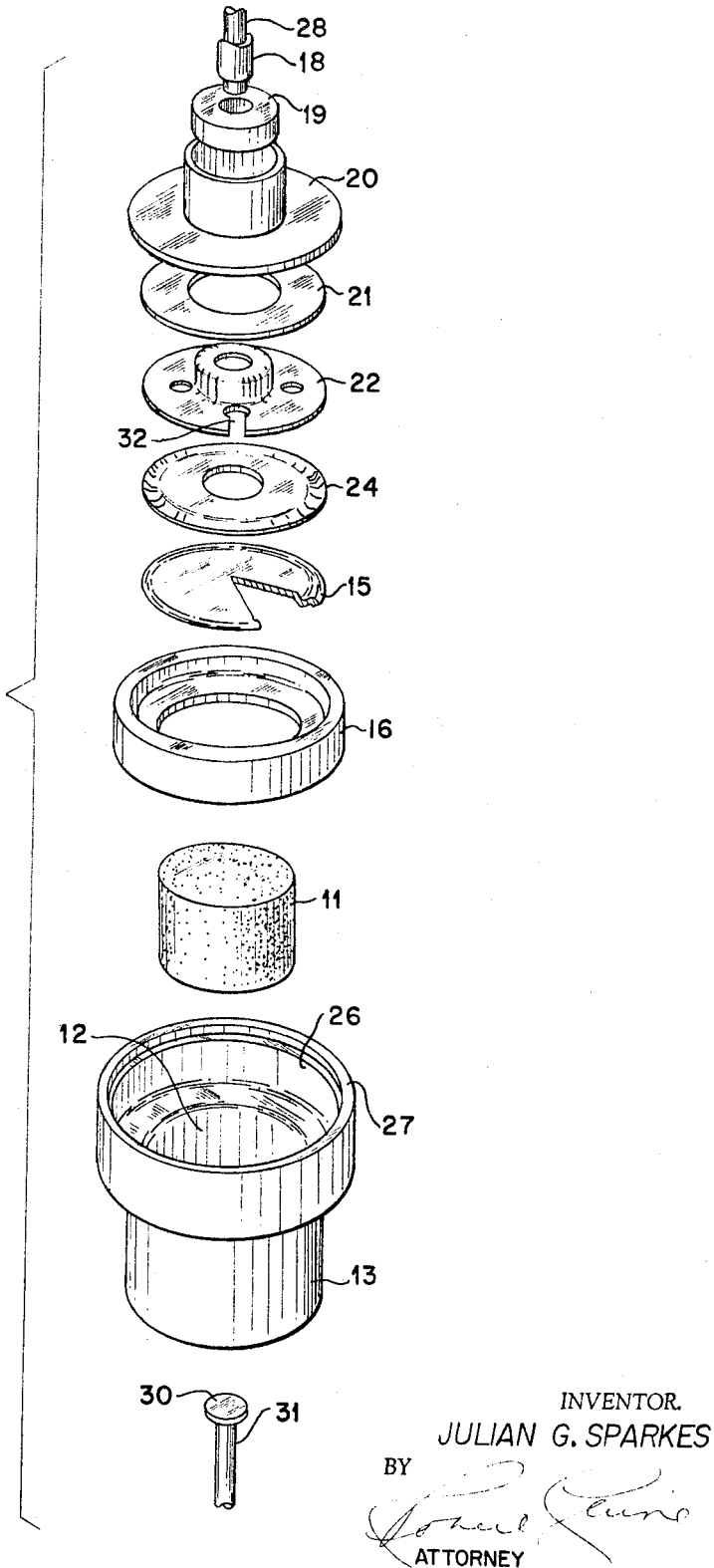

United States Patent Office 3,273,028
Patented Sept. 13, 1966

3,273,028
HERMETICALLY SEALED ELECTROLYTIC
CAPACITOR
Julian G. Sparkes, Indianapolis, Ind., assignor to P. R. Mallory & Co., Inc., Indianapolis, Ind., a corporation of Delaware
Filed June 27, 1963, Ser. No. 291,189
7 Claims. (Cl. 317—230)

This invention relates to electrolytic devices and has specific pertinence to the means and method for hermetically sealing a capacitor having a liquid electrolyte.

It has long been a problem to provide a true hermetic seal for capacitors having a liquid electrolyte, particularly in the case of miniaturized units. The prior art discloses numerous designs employing a resilient means of sealing, e.g., gaskets, grommets, sealing rings, etc. Although such resilient sealing expedients can be reasonably effective in confining the electrolyte under ordinary operating conditions, they have demonstrated serious limitations when subjected to extreme temperature ranges. Furthermore, positive isolation from external effects can only be assured by use of a true hermetic seal, and the resilient means of the prior art do not meet the requirements of a true hermetic seal.

A true hermetic seal, as understood by those skilled in the art, is only attained by means of a fusion of those members comprising the closure. The fusion must positively seal the contents from all external effects while preventing escape of said contents or any products generated therefrom.

By the means and method of the present invention there is provided a capacitor having a liquid electrolyte wherein the individual capacitor unit or cell is hermetically sealed. With this construction, therefore, it becomes unnecessary to enclose the cell in an outer can or container which would require subsequent sealing. Extreme miniaturization is thereby afforded and a hermetically sealed capacitor of heretofore unattainable compactness is herein disclosed to the art. Furthermore, the capacitor construction taught by the present invention is capable of operating throughout the temperature range of —55° C. to 175° C.

It is an object of the present invention, therefore, to provide an electrolytic capacitor having closure means which constitute a true hermetic seal.

It is another object of the present invention to provide a hermetically sealed electrolytic capacitor unit or cell which requires no additional means for enclosure, and which can operate throughout the temperature range of —55° C. to 175° C.

Yet another object of the present invention is to provide a hermetically sealed capacitor which can efficiently preserve a liquid electrolyte therein throughout the temperature range of —55° to 175° C.

Still another object of the present invention is to provide a hermetically sealed capacitor construction capable of extreme miniaturization.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the present invention and the nature thereof will become apparent from the following description considered in connection with the accompanying figures of the drawing and wherein like reference characters describe elements of similar function therein and wherein the scope of the invention is determined rather from the dependent claims.

In the drawing:

FIGURE 2 is an exploded perspective view, at an enlarged scale, of the component parts of the capacitor shown in FIGURE 1.

Figure 1:
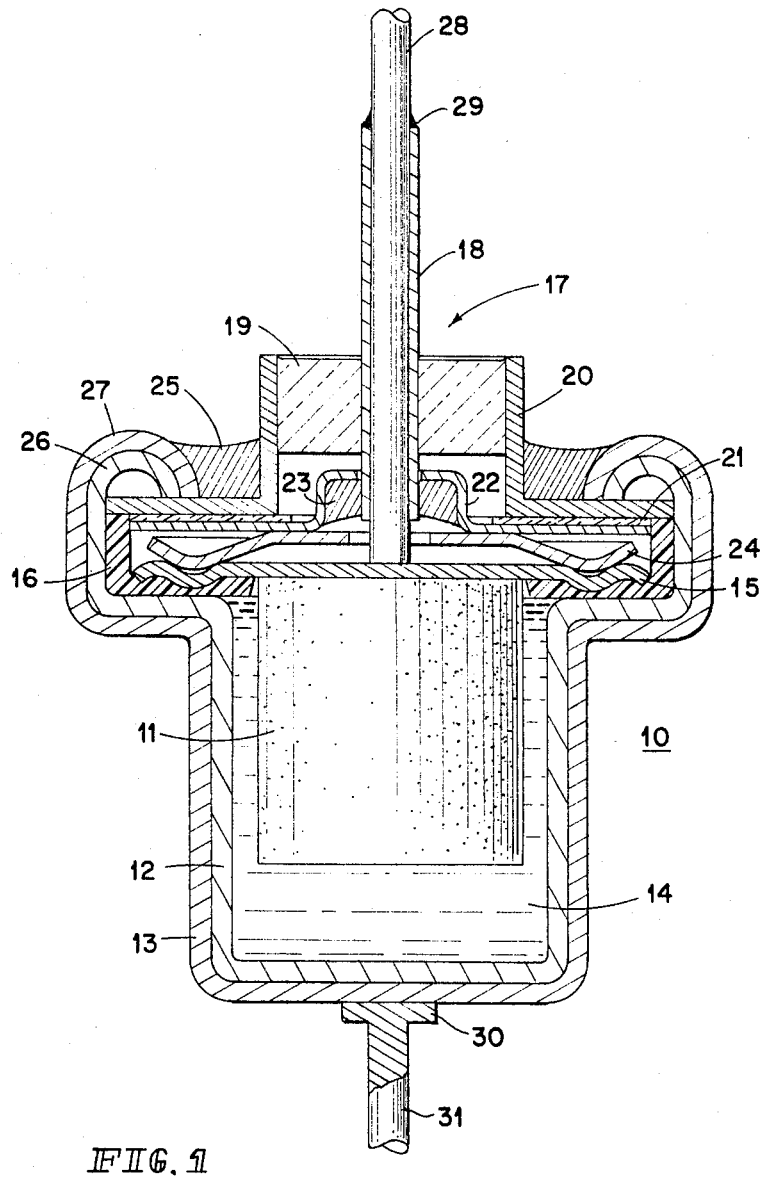
FIGURE 1 is a sectional elevational view, at an enlarged scale, of the capacitor embodiment taught by the present invention.

Referring now to FIGURE 1 of the drawing, the hermetically sealed electrolytic capacitor of the present invention is indicated generally by reference numeral 10. The actual height thereof is only 0.5 inch. The pellet-shaped anode 11 therein comprises a sintered body of a film-forming metal such as tantalum. Concentrically located with respect to anode 11 is cathode member 12. Cathode 12 is preferably composed of a metal which is electrochemically responsive to the electrolyte, while substantially inert thereto from a chemical corrosion standpoint. The metal silver was selected herein as the material of cathode 12. Surrounding cathode 12 and contiguous therewith is shell 13, composed of steel, which serves as a durable housing. It is to be recognized, however, that shell 13 may be eliminated without altering the effectiveness of the present invention.

Within the well section of cathode 12 is disposed a suitable liquid electrolyte 14, such as sulfuric acid. Anode top 15, a stamped member which is welded to the upper face of anode 11, serves to suspend anode 11 within electrolyte 14 while locating it with respect to cathode 12. Projection welding techniques have been found to produce excellent bonding between anode 11 and anode top 15. Anode top 15 is composed of a film-forming metal which resists chemical attack from the electrolyte, e.g., tantalum or niobium. To maintain separation between anode top 15 and cathode 12, an insulating gasket 16 is provided. Gasket 16 is composed of a material which is chemically inert to the electrolyte, for example, a tetrafluoroethylene polymer or a trifluorochloroethylene polymer. A clearance hole in gasket 16 assures concenrticity of anode 11 with respect to cathode 12.

The positive terminal sub-assembly, indicated by reference numeral 17, comprises iron alloy sleeve 18, glass insulating body 19, flanged steel collar 20, insulating disc 21 herein composed of mica, metallic contact washer 22, and solder ring 23. Glass body 19 is fused to sleeve 18 and to collar 20. The radial thickness of glass body 19 must be great enough to provide sufficient electrical leakage path.

Prior to final assembly of capacitor 10, metallic spring washer 24 is placed upon anode top 15 and it assumes a concentric position therewith by virtue of the geometry of the respective parts. Thereupon, positive terminal sub-assembly 17 is lowered atop spring washer 24, radial piloting with respect to cathode 12 being provided by the outside flange diameter of collar 20. The upper portions of cathode 12 and shell 13, indicated by reference numerals 26 and 27, respectively, are then spun over or crimped in a manner which exerts a vertically downward force upon collar 20. In turn, this force deflects spring washer 24 and creates a permanent preload which assures adequate contact with contact washer 22. At the same time, the contoured edge section of anode top 15 deforms the resilient material of gasket 16 in a manner which efficiently confines electrolyte 14 within the well section of cathode 12. Solder ring 25 is then fused into the void between crimped edge 27 and collar 20.

Positive lead wire 28 is then inserted into sleeve 18 and secured by pinch weld 29. This weld serves to complete the hermetic sealing of capacitor 10. Head section 30 of negative lead wire 31 is butt-welded to the bottom of shell 13 for cathodic contact.

The exploded view of FIGURE 2 shows in perspective the inter-relationship of parts. For purposes of venting during the aging operation, contact washer 22 is provided with holes and slots, shown typically at 32.

With reference again to FIGURE 1 of the drawing, it can be seen that a total of three fusion members is necessary to achieve the hermetic seal of the present invention. The fusion of glass body 19 with sleeve 18 and collar 20 comprises one seal. The fusion of solder ring 25 with collar 20 and crimped edge 27 comprises the second seal. The fusion of weld 29 with sleeve 18 and positive lead wire 28 comprises the third and final seal. Only through the cooperative action of these three fusion devices can true hermetic sealing of the unit be accomplished.

As hereinbefore mentioned, the radial separation of sleeve 18 and collar 20 must be great enough to insure an adequate leakage path or spark gap therebetween. This factor becomes especially critical under extreme miniaturization where it has been found that a collection of moisture on glass body 19 will cause losses at high capacitor voltages because of anode-to-cathode leakage.

The hermetically sealed capacitor of the present invention as hereinbefore described in one of its embodiments, is merely illustrative and not exhaustive in scope. Since many widely different embodiments of the invention may be made without departing from the scope thereof, it is intended that all matter contained in the above description and shown in the accompanying drawings shall be interposed as illustrative and not in a limiting sense.

What is claimed is:

1. In an electrolytic capacitor, a container-shaped cathode having one open end and a shoulder adjacent said end, an electrolyte contained within said cathode, an anode of film-forming metal concentrically disposed within said cathode, a resilient insulating member resting on said shoulder of the cathode, a top member affixed to said anode, and having a nonplanar marginal surface engaging said resilient insulating member providing a seal for said cathode and supporting said anode within said cathode, conductive spring means resting upon said anode top member, a positive terminal assembly comprising an inner tubular member and an outer encircling member separated by a glass-like insulating body fused with said inner and outer members forming a hermetic seal, a positive terminal wire projecting through said inner member and bonded thereto forming a hermetic seal, a contact washer contiguous with said spring means and affixed to said inner member for anodic contact, an insulating disc separating said contact washer from said outer member, and the open end of said cathode being turned over upon said outer member and comprising said spring means for deforming said resilient insulating member.

2. In an electrolytic capacitor as claimed in claim 1, said cathode end being bonded to said outer member forming a hermetic seal.

3. In a hermetically sealed electrolytic capacitor, a container-shaped cathode having one open end and a shoulder adjacent said end, an outer casing continuous with said cathode and conforming generally to the geometry of said cathode, an electrolyte contained within said cathode, an anode of film-forming metal concentrically disposed within said cathode, a resilient insulating member resting on said shoulder of the cathode, a circular top member of metal affixed to said anode and having a nonplanar marginal surface including a crimped section engaging with said resilient insulating member providing a seal for said cathode and supporting said anode within said cathode, conductive spring means resting upon said circular top member, a positive terminal assembly comprising an inner tubular member and an outer encircling member separated by a glass-like insulating body fused with said inner and outer members forming a hermetic seal, a positive terminal wire projecting through said inner member and bonded thereto forming a hermetic seal, a metallic contact washer contiguous with said spring means and affixed to said inner member for anodic contact, an insulating disc separating said contact washer from said outer member, the open ends of said cathode and said outer casing being turned over upon said outer member and compressing said spring means for deforming said resilient insulating member.

4. In a hermetically sealed electrolytic capacitor, a container-shaped cathode of a metal selected from the group consisting of copper and silver, said cathode having a well section, an open end, and a shoulder adjacent said open end, a liquid electrolyte contained within said well section, a porous cylindrical anode of film-forming metal concentrically disposed within said cathode and immersed in said electrolyte, a resilient insulating member resting on said shoulder of the cathode, a circular top member of metal affixed to the top of said anode and having a nonplanar marginal surface engaging with said resilient insulating member providing a seal for said cathode and supporting said anode within said cathode, a circular metallic spring washer resting upon said circular top member, a positive terminal assembly comprising an inner tubular member and an outer encircling member separated by a glass-like annular insulating body fused with said inner and outer members forming a hermetic seal, a positive terminal wire projecting through said inner member and bonded thereto forming a hermetic seal, a metallic contact washer contiguous with said spring washer and affixed to said inner member for anodic contact, an insulating disc separating said contact washer from said outer member, the open end of said cathode being turned over upon said outer member and comprising said spring washer for deforming said resilient insulating member.

5. In a hermetically sealed electrolytic capacitor, a container-shaped cathode of a metal selected from the group consisting of copper and silver, said cathode having a well section, an open end, and a shoulder adjacent said open end, an outer casing of steel contiguous with said cathode and conforming generally to the geometry thereof, a liquid electrolyte of sulfuric acid contained within said well section, a porous cylindrical anode of tantalum concentrically disposed within said cathode and immersed in said electrolyte, resilient insulating means resting on said shoulder of the cathode, said means comprising a gasket selected from the group consisting of polytetrafluoroethylene and polytrifluorochloroethylene adapted to confine said electrolyte within said well section of said cathode, a circular top member of tantalum affixed to the top of said anode and having a nonplanar marginal surface engaging with said gasket providing a seal for said cathode and supporting said anode within said cathode, a circular metallic spring washer resting upon said circular top member, a positive terminal assembly comprising a flanged steel outer collar and an iron alloy inner sleeve separated by a glass-like annular insulating body fused with said outer collar and said inner sleeve forming a hermetic seal, a positive terminal wire projecting through the bore of said inner sleeve and welded thereto to form a hermetic seal, a metallic contact washer contiguous with said spring washer and soldered to the lower portion of said inner sleeve for anodic contact, an insulating disc separating said contact washer from said outer collar, the open ends of said cathode and said outer casing being turned over upon said outer collar and compressing said spring washer for deforming said gasket.

6. In a hermetically sealed electrolytic capacitor, a container-shaped cathode of silver, said cathode having a well section, an open end, and a shoulder adjacent said open end, an outer casing of steel continuous with said cathode and conforming generally to the geometry thereof, a liquid electrolyte of sulfuric acid contained within said well section, a porous cylindrical anode of tantalum concentrically disposed within said cathode and immersed in said electrolyte, resilient insulating means resting on said shoulder of the cathode, said means comprising a gasket of polytetrafluoroethylene adapted to confine said electrolyte within said well section of said cathode, a circular top member of tantalum affixed to the top of said anode and having a nonplanar marginal surface including a crimped section engaging with said gasket providing a seal for said cathode and supporting said anode within said cathode, a circular metallic spring washer resting upon said circular top member and concentrically piloted therewith by a groove in the crimped section of said top member, a positive terminal assembly comprising a flanged steel outer collar and an iron alloy inner sleeve separated by a glass-like annular insulating body fused with said outer collar and said inner sleeve forming a hermetic seal, a positive terminal wire projecting through the bore of said inner sleeve and welded thereto to form a hermetic seal, a metallic contact washer contiguous with said spring washer and soldered to the lower portion of said inner sleeve for anodic contact, an insulating disc separating said contact washer from said outer collar, the open ends of said cathode and said outer casing being turned over upon said outer collar and compressing said spring washer for deforming said gasket.

7. In a hermetically sealed electrolytic capacitor as claimed in claim 6, said cathode end being soldered to said flanged outer member forming a hermetic seal and further including a negative terminal wire affixed to said cathode.

No references cited.

JOHN W. HUCKERT, *Primary Examiner.*

J. D. KALLAM, *Assistant Examiners.*